United States Patent
Tóka et al.

(10) Patent No.: US 11,512,981 B2
(45) Date of Patent: Nov. 29, 2022

(54) GMR OR TMR SENSOR USED WITH A FERROMAGNETIC ENCODER

(71) Applicants: Continental Teves AG & Co. oHG, Frankfurt am Main (DE); Continental Automotive GmbH, Hannover (DE)

(72) Inventors: Dániel Tóka, Veszprém (HU); Gábor Dernóczi, Veszprém (HU); Henrik Bacsák, Veszprém (HU); Tillmann Krauss, Frankfurt (DE)

(73) Assignees: Continental Teves AG & Co. oHG; Continental Automotive GmbH

( * ) Notice: Subject to any disclaimer, the term of this patent is extended or adjusted under 35 U.S.C. 154(b) by 100 days.

(21) Appl. No.: 16/558,815

(22) Filed: Sep. 3, 2019

(65) Prior Publication Data

US 2020/0116526 A1 Apr. 16, 2020

(30) Foreign Application Priority Data

Oct. 15, 2018 (DE) .......................... 102018217658.2

(51) Int. Cl.
*G01D 5/16* (2006.01)
*G01P 3/44* (2006.01)

(52) U.S. Cl.
CPC . *G01D 5/16* (2013.01); *G01P 3/44* (2013.01)

(58) Field of Classification Search
CPC .................................. G01D 5/16; G01P 3/44
See application file for complete search history.

(56) References Cited

U.S. PATENT DOCUMENTS

| | | | |
|---|---|---|---|
| 5,963,028 A * | 10/1999 | Engel | G01R 33/07 324/207.2 |
| 9,933,448 B1 | 4/2018 | Binder | |
| 9,958,292 B1 * | 5/2018 | Offermann | G01D 11/245 |
| 10,254,303 B2 | 4/2019 | Grambichler et al. | |

(Continued)

FOREIGN PATENT DOCUMENTS

| | | |
|---|---|---|
| CN | 202522578 U | 11/2012 |
| DE | 19853637 A1 | 6/1999 |

(Continued)

OTHER PUBLICATIONS

AD-Series GMR Switches, NVE Corporation, Oct. 2017, 16 pages.

(Continued)

*Primary Examiner* — Reena Aurora
(74) *Attorney, Agent, or Firm* — RatnerPrestia

(57) ABSTRACT

A speed sensor arrangement, implemented in particular as a wheel rotation speed sensor arrangement, including: a sensor and a ferromagnetic encoder. The sensor has at least one magnetic field sensor element and a signal processing circuit. The speed sensor arrangement having a permanent magnet and the magnetic field provided by the permanent magnet is modulated by the ferromagnetic encoder at least during a movement of the encoder and the magnetic field sensor element of the sensor detects this modulated magnetic field. The magnetic field sensor element is implemented as a GMR sensor element or as a TMR sensor element and the speed sensor arrangement is implemented such that the permanent magnet is arranged at a defined minimum distance from the magnetic field sensor element.

16 Claims, 3 Drawing Sheets

(56) References Cited

U.S. PATENT DOCUMENTS

2016/0327410 A1* 11/2016 Kochan, Jr. ............... H02P 6/16
2017/0358735 A1* 12/2017 Ausserlechner ........ H01L 43/02

FOREIGN PATENT DOCUMENTS

| DE | 102008015861 A1 | 10/2009 |
| DE | 102016225929 A1 | 6/2017 |
| DE | 102017109972 A1 | 11/2017 |
| DE | 102018200289 A1 | 7/2018 |

OTHER PUBLICATIONS

German Examination Report for German Application No. 10 2018 217 658.2, dated Aug. 30, 2019, with partial English Translation, 7 pages.
German Search Report for German Application No. 10 2018 217 658.2, dated Aug. 30, 2019, with partial English Translation, 11 pages.

\* cited by examiner

GMR OR TMR SENSOR USED WITH A FERROMAGNETIC ENCODER

CROSS REFERENCE TO RELATED APPLICATIONS

This application claims priority to German Patent Application No. 10 2018 217 658.2, filed Oct. 15, 2018, the contents of such applications being incorporated by reference herein.

FIELD OF THE INVENTION

The invention relates to a speed sensor arrangement.

BACKGROUND OF THE INVENTION

GMR-based wheel rotation speed sensors are known. However, these are usually used only in sensor configurations with permanent magnetic encoders, because the permanent magnet required for ferromagnetic encoders, for example gear wheels, the magnetic field of which is modulated by the ferromagnetic encoder, either negatively affects GMR sensor elements or else its magnetic field is too strong. It is also known to use magnetic particles bound into injection-molded material as permanent magnets for such purposes, and to provide the magnetic field in a directed manner, by means of special geometric shapes, which are possible when using such magnetic particles bound into injection-molded material as permanent magnets. These magnets have the disadvantage, however, that the magnetic field strength of the magnets is relatively weak.

SUMMARY OF THE INVENTION

An aspect of the invention is a speed sensor arrangement, which enables an accurate and/or robust and/or inexpensive detection of a ferromagnetic encoder.

The magnetic field sensor element is designed in accordance with an aspect of the invention as a GMR sensor element, i.e. a giant magnetoresistive sensor element or one based on the giant magnetoresistive principle, or as a TMR sensor element, i.e. as a tunnel magnetoresistive sensor element.

The ferromagnetic encoder preferably has an essentially periodic scale and/or pattern, and/or is more advantageously designed as, in particular, a ferromagnetic gear wheel or perforated disk or slotted disk.

The ferromagnetic encoder is preferably referred to as an encoder. The permanent magnet is preferably referred to as a magnet.

It is preferable that the magnetic field provided by the permanent magnet is modulated by the ferromagnetic encoder, at least during a movement of the encoder, and that the magnetic field sensor element of the sensor detects this modulated magnetic field and the signal processing circuit generates and/or calculates a speed signal from the magnetic field sensor element output signal.

The plastic housing of the sensor is advantageously implemented from epoxy and/or polyamide or another plastic material and produced by injection molding and/or injection pressing. It is preferred that the defined minimum distance between the permanent magnet and the magnetic field sensor element is greater than the length or the width of the magnetic field sensor element and/or is greater than 0.5 mm, in particular greater than 2 mm or 4 mm. It is advantageous that the permanent magnet is arranged separately from the sensor and has a separate mounting.

This mounting comprises in particular a retaining element, which is particularly preferably rod-shaped in design, made of plastic and/or fiberglass or non-magnetic metal.

It is preferable that the permanent magnet is mounted directly or indirectly on the sensor by means of a coupling element or that the sensor is mounted on the coupling element, in particular in the same way as the permanent magnet mounted separately on the coupling element. The coupling element is advantageously a connecting element, produced for example from plastic and/or fiberglass, in particular by injection molding.

It is preferred that the coupling element is implemented such that it encompasses the encoder at a distance, the sensor and the magnet being arranged on two different and/or opposite sides of the encoder, the coupling element having, in particular, a fork-shaped and/or C-shaped and/or pincer-shaped design.

The coupling element is preferably clipped or screwed onto the sensor, and/or connected thereto with a positive fit and/or alternatively, preferably materially bonded thereto. In particular, the sensor is connected to a part of the vehicle chassis or suspension, particularly preferably by means of a screw connection.

The mounting of the permanent magnet and the retaining element and/or coupling element is preferably implemented by means of an adhesive or by means of injection molding, or at least by partial overmolding.

It is advantageous if the speed sensor arrangement is designed such that the permanent magnet and the sensor are arranged on two different and/or opposite sides of the encoder.

Alternatively, the permanent magnet is integrated into the sensor, the sensor consisting of a plastic housing in which the permanent magnet is arranged or on which the permanent magnet is arranged.

It is advantageous that the permanent magnet is not implemented by injection molding-bound magnetic particles.

The permanent magnet is preferably implemented as a ferrite, or alternatively, preferably as a ferromagnet, in particular containing neodymium.

The permanent magnet is advantageously substantially donut-shaped or toroidal, and/or has a magnetic flux concentrator element in order to focus the magnetic field generated thereby more strongly or to steer it in the desired direction.

It is advantageous if the retaining element or coupling element is arranged and designed so that the permanent magnet mounted thereon is arranged at the side of the ferromagnetic encoder, on the vehicle chassis or suspension part, or on the opposite side of the ferromagnetic encoder. The sensor is in particular arranged and mounted and/or connected to the permanent magnet by means of the coupling element such that the sensor is positioned on the front face relative to the ferromagnetic encoder.

It is preferable that the sensor has a lead frame on which the magnetic field sensor element is arranged, the permanent magnet being arranged on the opposite side of the lead frame, in particular spaced apart from the lead frame by a part of the plastic housing.

It is advantageous if the permanent magnet, which is arranged, in particular, on the opposite side of the lead frame, is arranged separately and/or spaced apart from the lead frame and/or the magnetic field sensor element by a part of the plastic housing and/or a spacer embedded in the plastic housing, in particular implemented in plastic.

Preferably, the permanent magnet is fully embedded in the plastic housing of the sensor.

Advantageously, at least part of the permanent magnet is received by the spacer, implemented in particular as a support or carrier element, and/or held thereby in an enclosed manner. The permanent magnet is, in particular, clipped into this spacer, and the spacer is embedded or injected into the plastic housing of the sensor with the permanent magnet.

It is preferable for the magnetic field sensor element and the signal processing circuit are integrated on a chip and the spacer receives or encompasses the chip, in particular additionally, and wherein the sensor; in particular, does not have a lead frame.

The sensor and/or the retaining element of the permanent magnet or the coupling element are preferably mounted or arranged on the vehicle chassis or a part of the suspension of a motor vehicle, for example, on the front wheel forks of a motorcycle.

An aspect of the invention also relates to the use of the wheel rotation speed sensor arrangement in a motorcycle and/or in a single-track motor vehicle and/or in a two-wheeled motor vehicle.

REFERENCE NUMERALS 1 wheel axle, rotational axis
2, 2a fixing means of the encoder
3 ferromagnetic encoder
4 sensor
5 retaining element of the permanent magnet
6 permanent magnet
7 coupling element or connection element between sensor and permanent magnet
8 connection cable of sensor
9 air gap between sensor and magnet
10 sensor mounting by means of screw connection
11 vehicle chassis or suspension part
12 magnetic field sensor element
13 spacer

DETAILED DESCRIPTION OF THE PREFERRED EMBODIMENTS

Figure 1A:
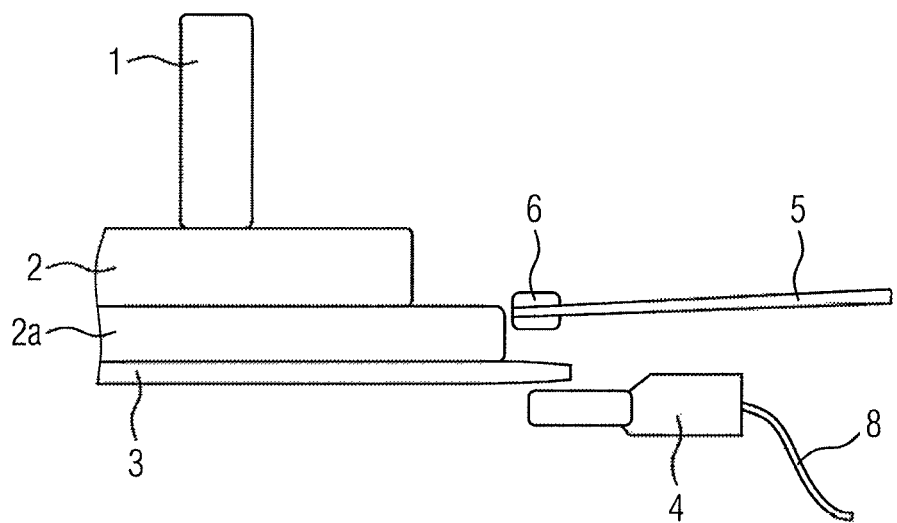
FIGS. 1A to 5 show, in a schematic representation, exemplary embodiments of the speed sensor arrangement.

FIG. 1A illustrates an example speed sensor arrangement, in which a ferromagnetic encoder 3 is mounted by means of two mounting means or mounting washers 2, 2a on the wheel axle 1 or rotational axis, the speed of which is to be detected or measured.

Sensor 4, with a connecting cable 8, sensor 4 comprising a magnetic field sensor element, not shown, and a signal processing circuit, is positioned so as to be coupled to the encoder across an air gap and detects the magnetic field which permanent magnet 6 produces and which is modulated by ferromagnetic encoder 3 in the course of its movements. The permanent magnet 6 and sensor 4 are arranged on opposite sides of the ferromagnetic encoder 3. The permanent magnet 6 is positioned by means of a rod-shaped plastic retaining element 5, in accordance with the example independently of mounting means of the sensor 4.

Figure 1B:
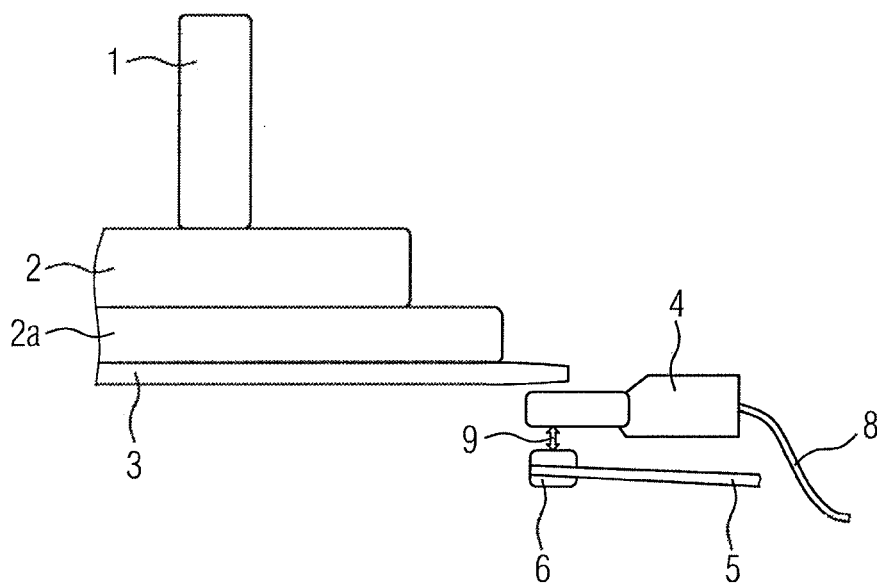

In FIG. 1B, in contrast to FIG. 1A, sensor 4 and permanent magnet 6 are arranged on the same side of the ferromagnetic encoder 3. Permanent magnet 6, however, is arranged separately from the sensor 4 and has its own mounting, formed by the plastic rod-shaped retaining element 5. In the exemplary embodiment of FIG. 1B a defined minimum distance 9 is also implemented between the magnetic field sensor element in sensor 4 and permanent magnet 6, this distance being even larger than the illustrated distance 9 because of the sensor housing.

Figure 2:
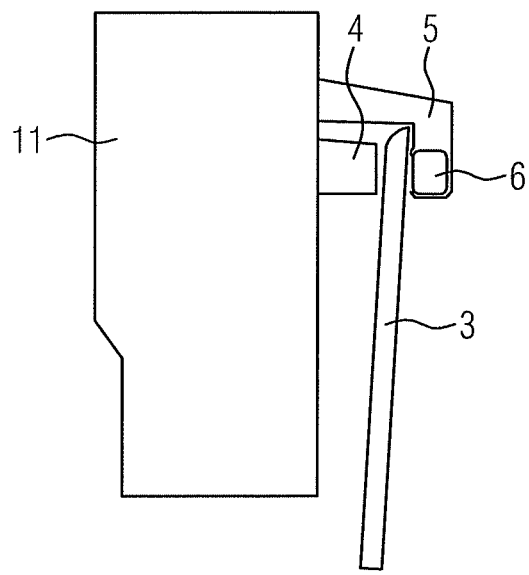

FIG. 2 shows an exemplary embodiment of the speed sensor arrangement as a wheel rotation speed sensor arrangement, wherein by means of a retaining element 5, which encompasses the ferromagnetic encoder 3 in an L-shape, permanent magnet 6 is arranged on the side facing away from the vehicle chassis 11. Permanent magnet 6 is arranged on the other side and substantially opposite sensor 4, which is mounted directly on the vehicle chassis 11. Permanent magnet 6 is partly injection-molded into retaining element 5 and secured accordingly.

Figure 3:
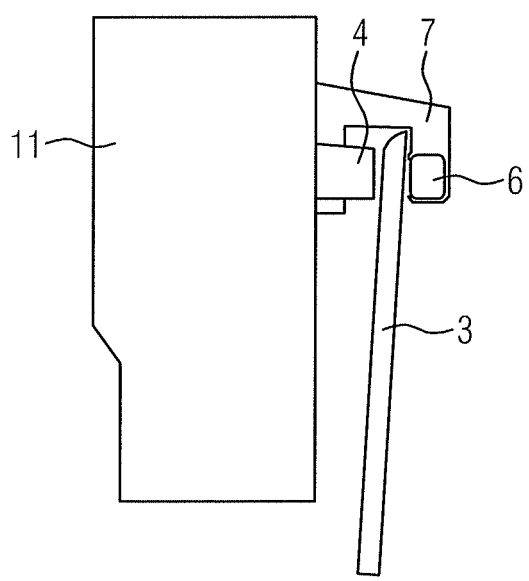

FIG. 3 illustrates an exemplary embodiment of the wheel rotation speed sensor arrangement, in which coupling element 7 is designed such that it encompasses the ferromagnetic encoder 3 at a distance thereto, and wherein the sensor 4 and the permanent magnet 6 are arranged on two different or opposite sides of the encoder 3. In this case the coupling element 7 is designed to be substantially C-shaped, and by means of an example screw connection, or in an alternative variant possibly also by clipping or securing by means of injection molding, connected to sensor 4 and accordingly positioned and mounted above the latter. Sensor 4 is itself mounted on the vehicle chassis 11, in accordance with the example, by means of a screw connection, not shown.

Figure 4:
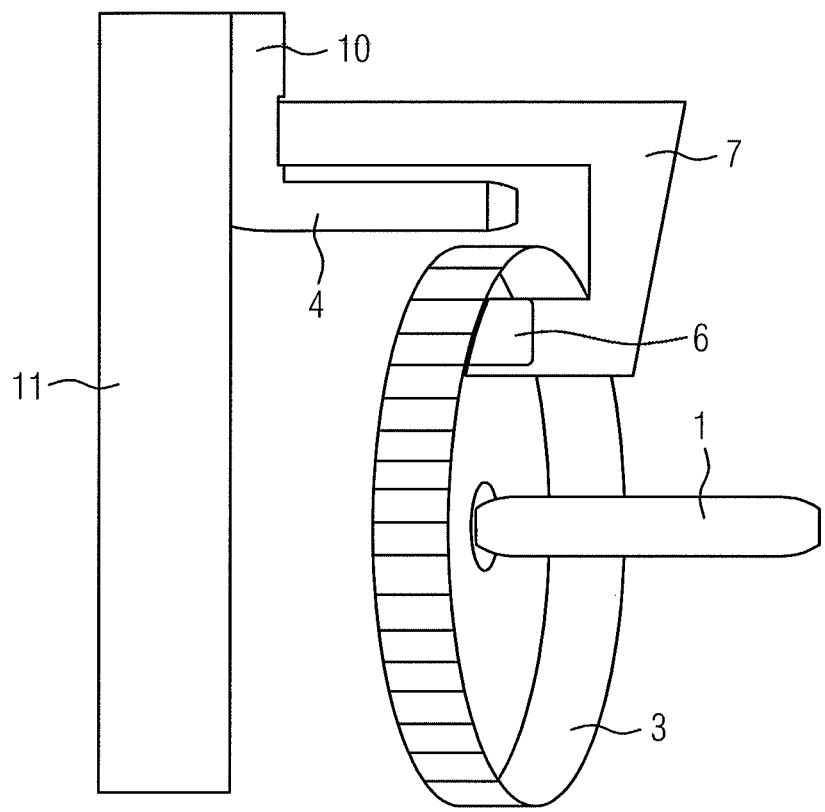

FIG. 4 shows an exemplary embodiment of the wheel rotation speed sensor arrangement in which sensor 4 is fastened to vehicle chassis 11 or to an engine part by means of a screw connection 10. Permanent magnet 6 is secured by means of coupling element 7 to sensor 4, wherein the attachment between coupling element 7 and sensor 4 in the case of the example is positive-fitting, but alternatively can be attached, for example, in a materially bonded manner or directly to vehicle chassis 11 or the engine part. Coupling element 7 encompasses ferromagnetic encoder 3, which is secured to the shaft or wheel axle 1, substantially in a C-shape, so that in relation to the encoder, permanent magnet 6 is arranged on the other or opposite side with respect to the vehicle chassis 11 or the engine part. In relation to the ferromagnetic encoder 3, sensor 4 is arranged on its front face and to this end, has an L-shaped housing or an L-shaped mounting as shown in the example.

Figure 5:
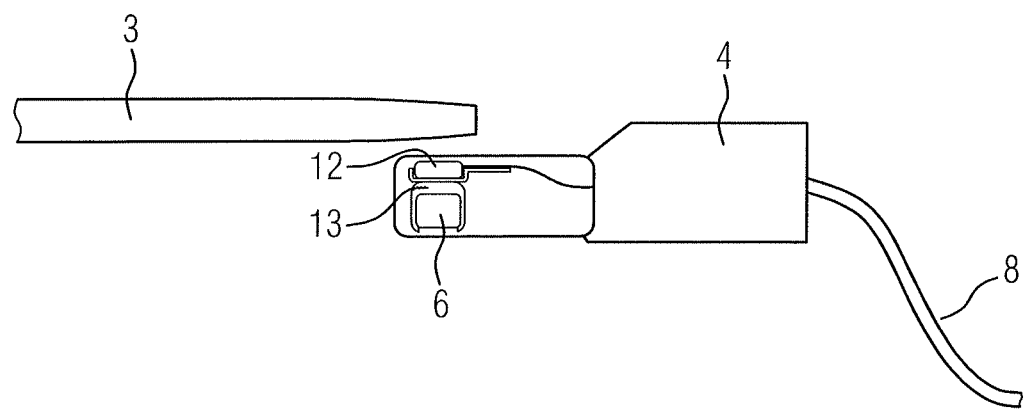

FIG. 5 shows an exemplary wheel rotation speed sensor arrangement, wherein sensor 4 is spaced laterally apart from the ferromagnetic encoder 3 via an air gap. Sensor 4 comprises connection cable 8. The sensor has a magnetic field sensor element 12, which is integrated in an ASIC together with the signal processing circuitry. This ASIC is also received along with permanent magnet 6 by the plastic spacer 13, which guarantees a defined minimum distance between magnetic field sensor element 12 and permanent magnet 6. Spacer 13, which positions the ASIC and permanent magnet 6 relative to each other and in accordance with the example at least partially receives them, are jointly overmolded by a plastic housing of the sensor 4 made of epoxy, or embedded therein in a sealed manner.

The invention claimed is:

1. A speed sensor arrangement, implemented as a wheel rotation speed sensor arrangement, comprising a sensor and a ferromagnetic encoder, wherein the sensor has at least one magnetic field sensor element and a signal processing circuit, the speed sensor arrangement having a permanent magnet and wherein the magnetic field provided by said permanent magnet is modulated by the ferromagnetic encoder at least during a movement of the encoder and the magnetic field sensor element of the sensor detects this modulated magnetic field, wherein the magnetic field sensor element is implemented as a GMR sensor element or as a TMR sensor element and the speed sensor arrangement is implemented such that the permanent magnet is arranged at a defined minimum distance from the magnetic field sensor element, and wherein the defined minimum distance is greater than a length or a width of the magnetic field sensor element.

2. The speed sensor arrangement as claimed in claim 1, wherein the ferromagnetic encoder is implemented substantially as a gear wheel or a perforated disc.

3. The speed sensor arrangement as claimed in claim 1, wherein the permanent magnet is arranged separately from the sensor and has a separate mounting.

4. The speed sensor arrangement as claimed in claim 3, wherein said mounting comprises a retaining element, having a rod-shaped design, made of plastic and/or fiberglass or non-magnetic metal.

5. The speed sensor arrangement as claimed in claim 3, wherein the speed sensor arrangement is designed such that the permanent magnet and the sensor are arranged on two different and/or opposite sides of the encoder.

6. The speed sensor arrangement as claimed in claim 5, wherein the permanent magnet, which is arranged on the opposite side of the lead frame, is arranged separately and/or spaced apart from the lead frame and/or the magnetic field sensor element by a part of the plastic housing and/or a spacer embedded in the plastic housing, implemented in plastic.

7. The speed sensor arrangement as claimed in claim 1, wherein the permanent magnet is mounted on the sensor directly or indirectly by a coupling element or the sensor is mounted on the coupling element, in the same way as the permanent magnet mounted separately on the coupling element.

8. The speed sensor arrangement as claimed in claim 7, wherein the coupling element is implemented such that it encompasses the encoder at a distance and wherein the sensor and the magnet are arranged on two different and/or opposite sides of the encoder, the coupling element having a fork-shaped and/or C-shaped and/or pincer-shaped design.

9. The speed sensor arrangement as claimed in claim 1, wherein the permanent magnet is integrated into the sensor, the sensor consisting of a plastic housing in which the permanent magnet is arranged or on which the permanent magnet is arranged.

10. The speed sensor arrangement as claimed in claim 9, wherein the sensor has a lead frame on which the magnetic field sensor element is arranged, wherein the permanent magnet is arranged on the opposite side of the lead frame, spaced apart from the lead frame by a part of the plastic housing.

11. The speed sensor arrangement as claimed in claim 10, wherein the permanent magnet, which is arranged on the opposite side of the lead frame, is arranged separately and/or spaced apart from the lead frame and/or the magnetic field sensor element by a part of the plastic housing and/or a spacer embedded in the plastic housing, implemented in plastic.

12. The speed sensor arrangement as claimed in claim 9, wherein the permanent magnet is completely embedded in the plastic housing of the sensor.

13. The speed sensor arrangement as claimed in claim 9, wherein the permanent magnet is at least partially received by the spacer and/or held thereby so as to enclose it, clipped into said spacer, and the spacer with the permanent magnet are jointly embedded in the plastic housing of the sensor.

14. The speed sensor arrangement as claimed in claim 13, wherein the magnetic field sensor element and the signal processing circuit are integrated on a chip and the spacer receives or additionally encompasses the chip, and wherein the sensor does not have a lead frame.

15. A use of the speed sensor arrangement as claimed in claim 1 as a wheel rotation speed sensor arrangement in a motorcycle and/or in a single-track motor vehicle and/or in a two-wheeled motor vehicle.

16. The speed sensor arrangement as claimed in claim 1, wherein the ferromagnetic encoder is positioned between the permanent magnet and the magnetic field sensor element.

* * * * *